July 1, 1941.  C. E. KRAUS  2,247,582

METHOD OF AND MACHINE FOR MILLING

Filed June 19, 1940  5 Sheets-Sheet 1

INVENTOR
Charles E. Kraus
By Parker, Carlson, Pitzner & Hubbard
ATTORNEYS

July 1, 1941.  C. E. KRAUS  2,247,582

METHOD OF AND MACHINE FOR MILLING

Filed June 19, 1940   5 Sheets-Sheet 4

INVENTOR
Charles E. Kraus
By Parker, Carlson, Pitzner & Hubbard
ATTORNEYS

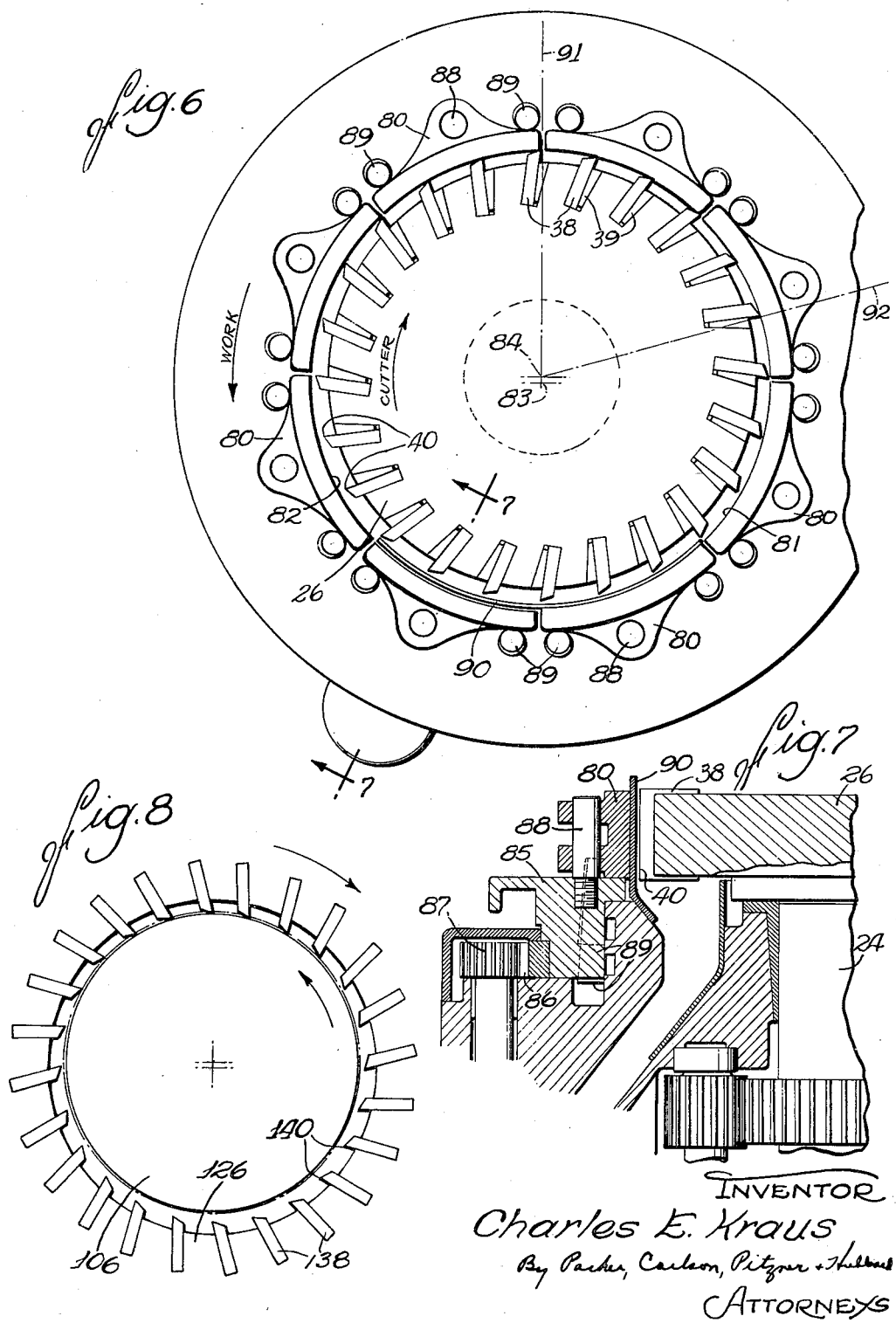

Patented July 1, 1941

2,247,582

UNITED STATES PATENT OFFICE 2,247,582

METHOD OF AND MACHINE FOR MILLING

Charles E. Kraus, Rockford, Ill., assignor to The Ingersoll Milling Machine Company, Rockford, Ill., a corporation of Illinois Application June 19, 1940, Serial No. 341,301

22 Claims. (Cl. 90—20)

This invention relates to the milling of circular surfaces or at least arcs thereof on metal work pieces and the general object is to provide a novel method and machine by which such surfaces may be machined at speeds substantially greater than those heretofore in practice.

The invention also resides in the novel character of the machine by which the method is practiced.

Other objects and advantages of the invention will become apparent from the following detailed description taken in connection with the accompanying drawings, in which Figure 1 is a fragmentary vertical sectional view of the machine for carrying out the present invention.

Fig. 6 is a plan view illustrating an adaptation of the invention for milling arcuate surfaces.

Fig. 7 is a section taken along the line 7—7 of Fig. 6.

Fig. 8 is a diagrammatic view of another modification.

Figure 1:
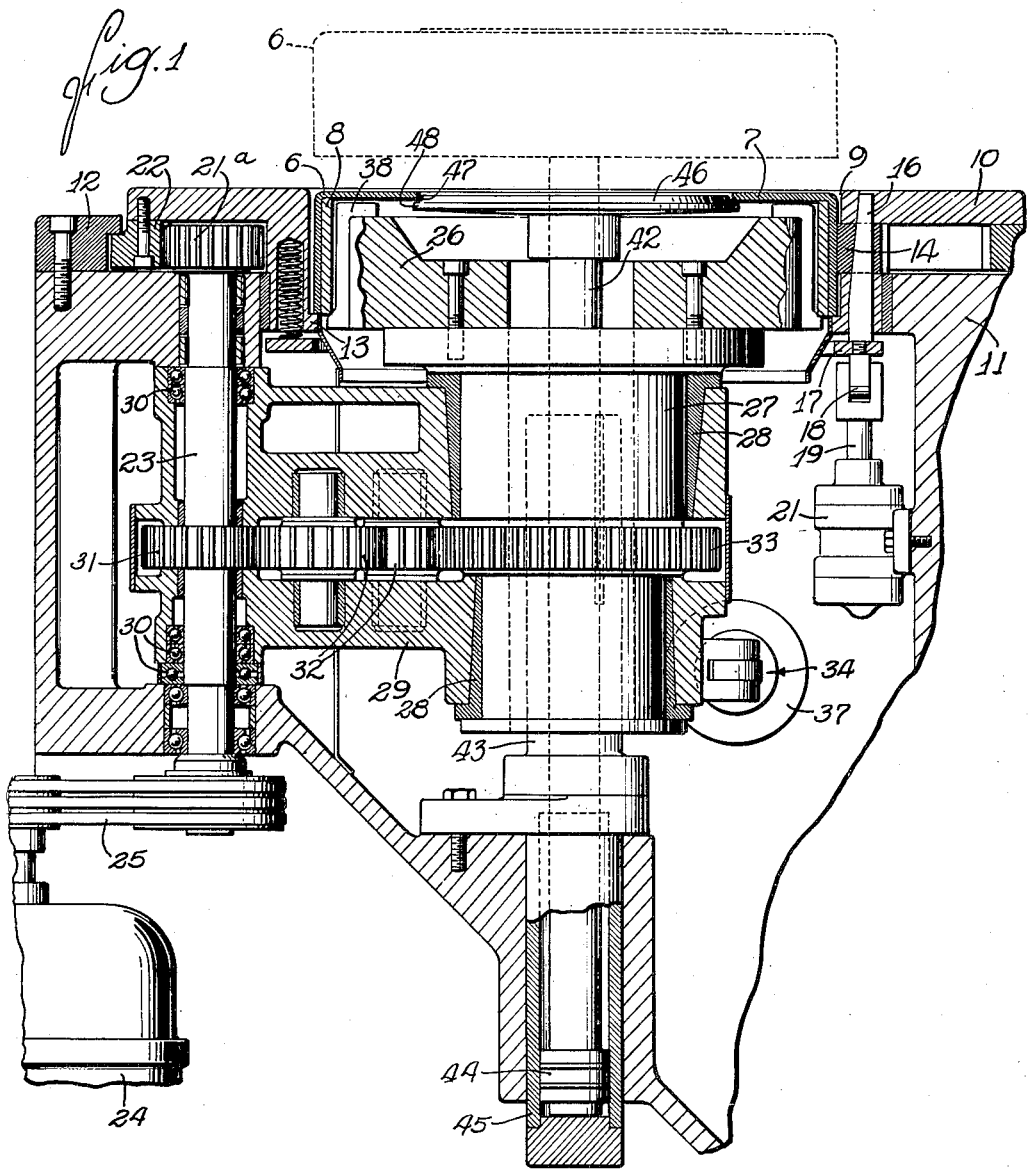

The present invention may be utilized to best advantage in milling circular surfaces of relatively large diameter or arcs thereof and is, for purposes of exemplification, illustrated in the drawings in connection with removal of a thin layer of metal from the internal cylindrical surface of a work piece. It will be apparent, however, as the description proceeds, that the invention is applicable to the machining of either external or internal surfaces which are tapered, cylindrical, or of irregular contour. Therefore, I do not intend to limit the invention by the present disclosure but aim to cover all modifications and alternative constructions and methods falling within the spirit and scope of the invention as expressed in the appended claims.

Generally stated, the invention comprises rotating a series of cutting edges in a circle differing only slightly in size from the rough work surface to be machined with the edges disposed relative to the rotational axis according to the contour to be formed, positioning the work piece and the edges with the circles of the edges and the finished surface to be formed one within the other radially offset so as to be tangent to the other, and relatively rotating the work piece and the rotating edges around the axis of the finished work surface to traverse the point of tangency circumferentially across the work area to be machined. Preferably, the circle of revolution of the cutting edges differs from the diameter of the finished work surface by an amount not materially greater than the depth of the metal layer to be removed plus the clearance required to permit positioning of the work and cutter. In view of the thin layer of metal ordinarily required to be removed in production milling, the diameter of the cutting edges so closely approaches that of the finished work surface that each edge engages the work through a long arc and the maximum thickness of the chip removed will not be influenced appreciably by the rate of rotary feeding movement. Accordingly, this rate of feed and therefore the rate of metal removal may be multiplied several times as compared to present practice without exceeding the permissible thickness of the chip as determined by the kind of cutting material used.

Referring first to Figs. 1 to 4 of the drawings, the exemplary machine therein shown for carrying out the improved method is adapted especially for milling the interiors of vehicle brake drums 6. Usually, such drums comprise a pressed metal cylinder having an inturned flange 7 at one end and a liner 8 of metal centrifugally cast around the interior thereof. It is desirable to remove from the interior of the liner a surface layer 8ª which is usually about one-eighth of an inch thick and is shown on an exaggerated scale in Fig. 3.

In the present instance, the drum to be milled is mounted in a central recess 9 of a table 10 rotatably supported around its periphery on a stationary frame 11 on which the table is held by a clamping ring 12. The open end of the drum abuts against an inturned flange 13 on the table. Annularly spaced around the table are a series of clamps 14 urged outwardly by springs 15 and forced into gripping engagement with the periphery of the drum by endwise movable cam slides 16. The latter are attached at their lower ends to a ring 17 which rides on rollers 18 carried by the rods 19 of pistons 20 within a plurality of stationary hydraulic cylinders 21. By controlling the admission of pressure fluid to the lower and upper ends of the cylinders, the cams 16 are actuated to clamp and release the drum then supported by the table.

Rotation of the table is effected herein through the medium of a power driven pinion 21ª meshing with an internal ring gear 22 attached to the underside of the table. The pinion is on a vertical shaft 23 journaled in the frame 11 and driven by an electric motor 24 through the medium of belts 25 or other transmission mechanism having a driving connection with the lower end of the shaft.

The milling cutter includes a cylindrical body 26 fast on the upper end of a vertical spindle 27 journaled in bearings 28 which are supported by a ruggedly constructed arm 29 mounted on bearings 30 to swing horizontally about the shaft 23 as a pivot. In all positions of the arm, power is transmitted to the cutter spindle through the medium of a pinion 31 on the shaft 23, idle gears 32 on the arm, and a gear 33 on the spindle. For the purpose of swinging the arm 29, the free end of the latter is connected at 34 to the rod 35 of a piston 36 within a cylinder 37 to either end of which pressure fluid may be admitted. Movement of the arm to opposite positions later to be described may be limited by engagement of the piston 36 with opposite ends of the cylinder.

Projecting from the periphery of the cutter body 26 and spaced around the periphery thereof are a series of blades 38 suitably locked in place by means such as wedges 39. The cutting edge 40 of each blade is shaped and positioned relative to the cutter axis according to the contour to be formed on the work, being disposed parallel to the axis in the present instance. As contemplated by the present invention, each edge is spaced from the cutter axis a distance equal to the radius of the rough surface 41 of the drum less the clearance $a$ (Fig. 3) which it is desired to provide for enabling the cutter to be received within the drum.

To facilitate loading and unloading of the machine, the spindle 27 is made hollow and a rod 42 extending vertically and axially therethrough is guided in a sleeve 43 on the machine frame. The lower end of the rod carries a piston 44 reciprocable in a cylinder 45. Fast on the upper end of the rod is a disk 46 having an upwardly facing tapered projection 47 for engaging the inner edge of the drum flange 7 and guiding the drum into centered position or against an annular ledge 48.

Figure 2:
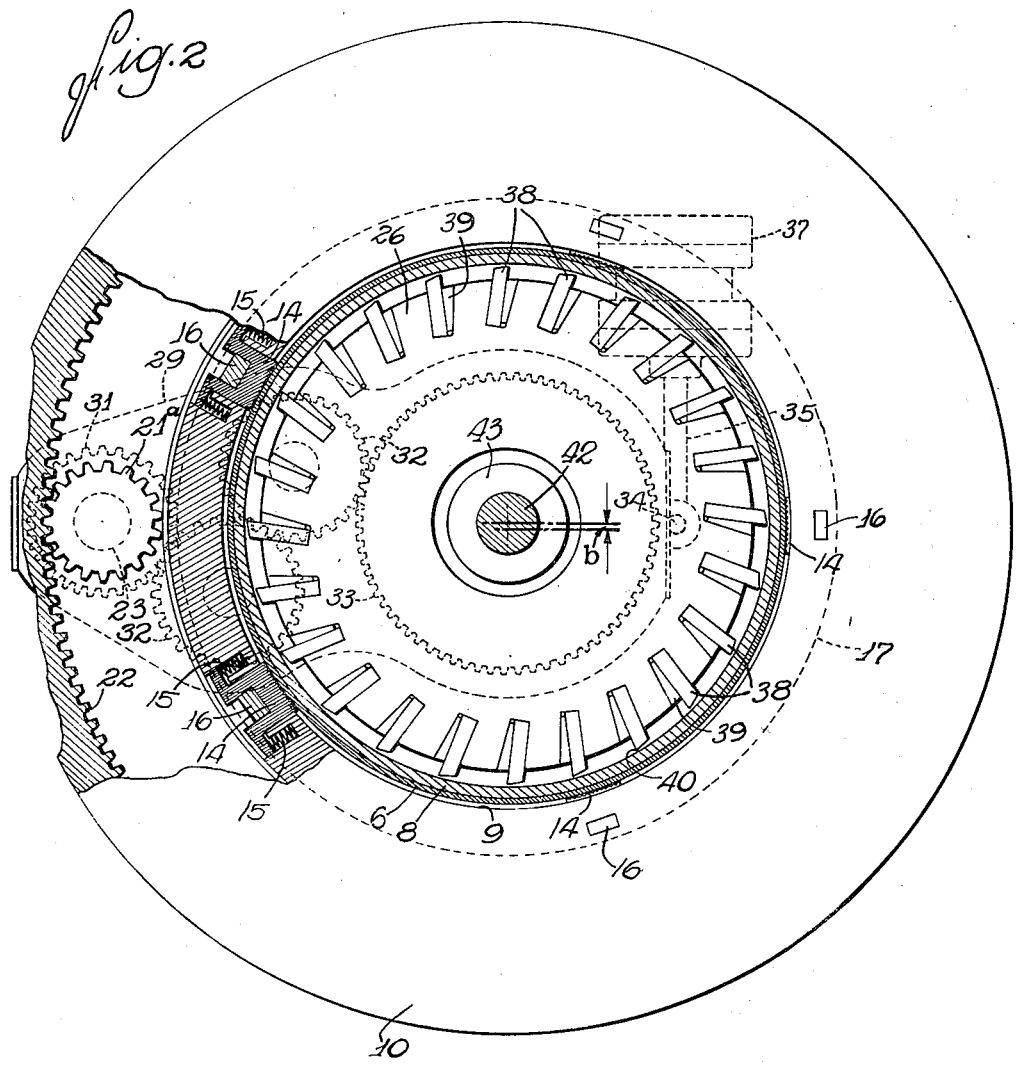
Fig. 2 is a plan view with certain of the parts broken away and shown in section.
Figure 3:
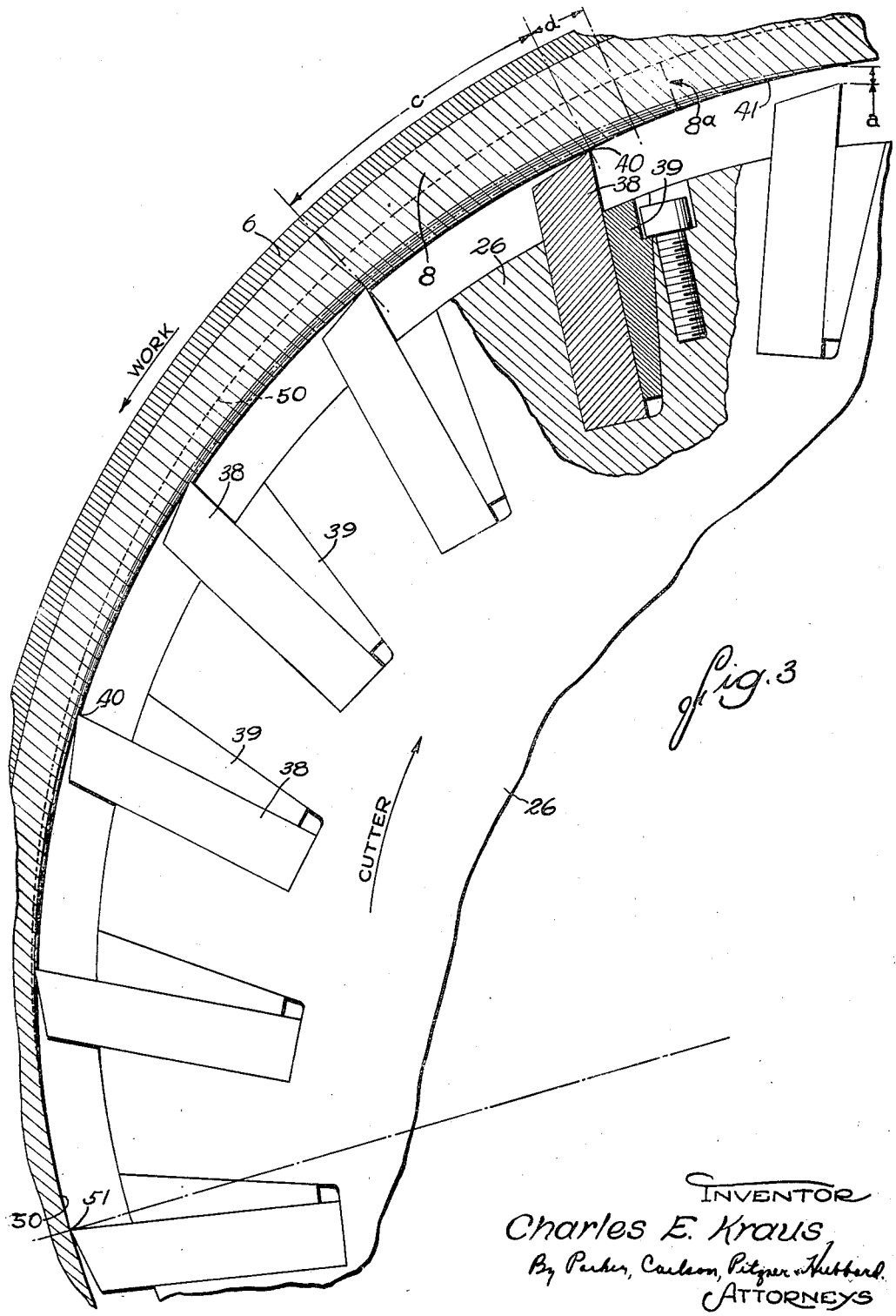
Fig. 3 is an enlarged view of a portion of Fig. 2.
Figure 4:
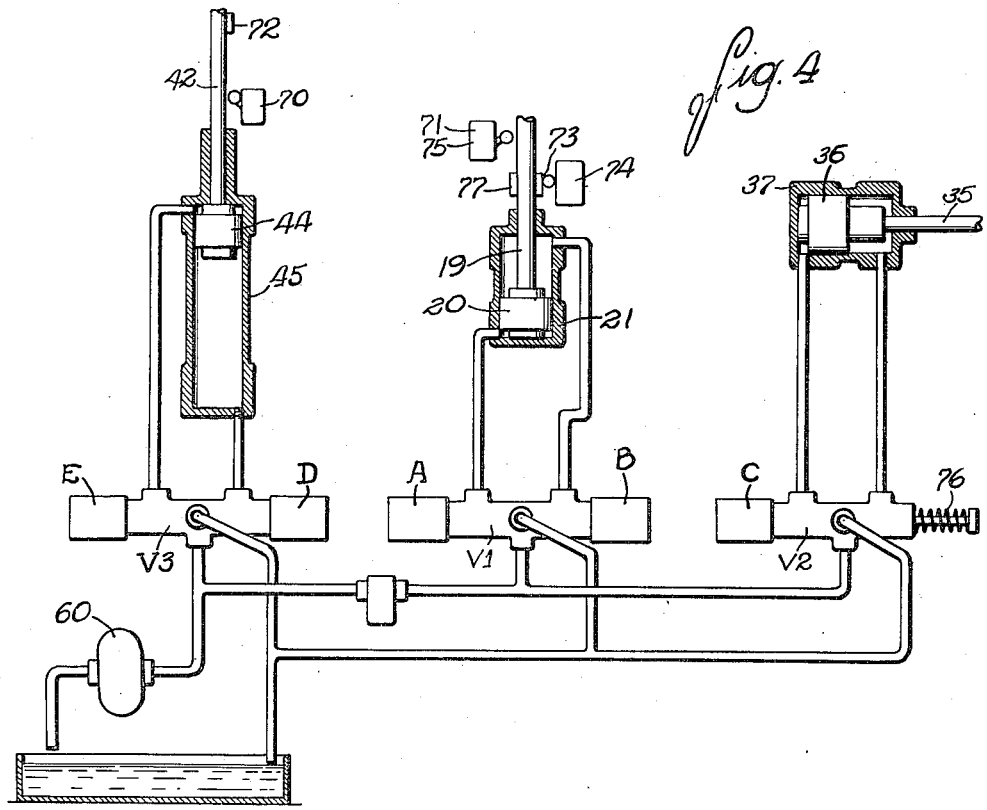
Figs. 4 and 5 are schematic views and circuit diagrams.

The operation of the machine described above involves continuously rotating the work fixture and the cutter, inserting of a work piece or drum 6 in the fixture while the cutter and table axes are coincident as shown in Fig. 2, moving the cutter supporting arm 29 laterally through a distance $b$ to feed the cutter to the proper depth with the cylinders of revolution of the cutter and finished work surface disposed one within the other and tangent to each other, and finally rotating the table through at least one revolution to advance the point of tangency around the entire internal surface of the drum. The action of the cutting edges after such lateral feed is illustrated in Fig. 3 on a somewhat exaggerated scale. Preferably, the cutter and work piece rotate in opposite directions as indicated by the arrows, the cutter being turned through an arc $c$ while the work moves a distance $d$. The latter distance is equal to the feeding movement per cutter tooth while the distances $c$ and $d$ multiplied by the number of cutter teeth and the speed of the cutter equals the cutting speed.

Each cutting edge 40 enters the work on the finished surface 50 at a point 51 and progresses through the liner 8 along a path indicated by the dot-dash lines (Fig. 3) and having a circumferential length substantially greater than forty-five degrees and approaching ninety degrees when full advantage is taken of the increased feed rates which are permissible. The chip formed by each edge as indicated by the space between the adjacent dot-dash lines is very thin near the point of blade entry and increases in thickness progressively but at a very slow rate, reaching a maximum thickness adjacent the point of disengagement with the work on the rough surface 41. Normally, the chip thickness will be less than one-twentieth of the circumferential length of the chip.

Such thinness of the chip removed by each blade and extreme elongation of the chip in the direction of the rotary feeding movement is due to the fact that the curvature of the path in which each cutting edge travels closely approaches the curvature of the finished work surface. That is to say, the radius of the finished work surface 50 should be more than seventeen times the sum of the depth of cut or thickness of the metal layer 8$^a$ removed by the cutter plus the clearance between the rough work surface 41 and the periphery of the cutter when the work and cutter axes are coincident. Preferably, this ratio is greater than seventeen as in the embodiment illustrated in Fig. 3 of the drawings. A maximum rate of metal removal will be obtained for a given depth of cut when the ratio is made as large as possible while allowing sufficient clearance to permit entry of the cutter into the rough work piece. As a result of this relation, the maximum thickness of the chip removed by each blade is only a very small fraction of the feeding movement of the work piece per cutter tooth. Accordingly, the rate of rotation or feed of the work may be increased many times as compared to prior practice without exceeding the maximum permissible chip thickness which is determined by the kind of cutting material used. The maximum permissible chip thickness is also determined by the character of the finish desired and the allowable cutting speed which may be divided in various ratios between the cutter speed and the work feed. For example, let it be assumed that the internal diameter of the rough brake drum is 14 inches, that the cutter is 13¾ inches in diameter, that a metal layer $\frac{1}{16}$ of an inch thick is to be removed, that the allowable cutting speed is 180 feet per minute, and that the desired finish is obtained when the cutting speed is divided between cutter speed and feed speed in the ratio of 13 to 5. For such a typical application, the feed rate, that is, the peripheral speed of the work piece, would be fifty feet per minute and the maximum chip thickness would be approximately .016 of an inch which is well within the range permissible for use with ordinary cutting materials and for producing a smooth finish. If a better finish is desired, the feed rate may be reduced and the cutter speed increased.

Figure 5:
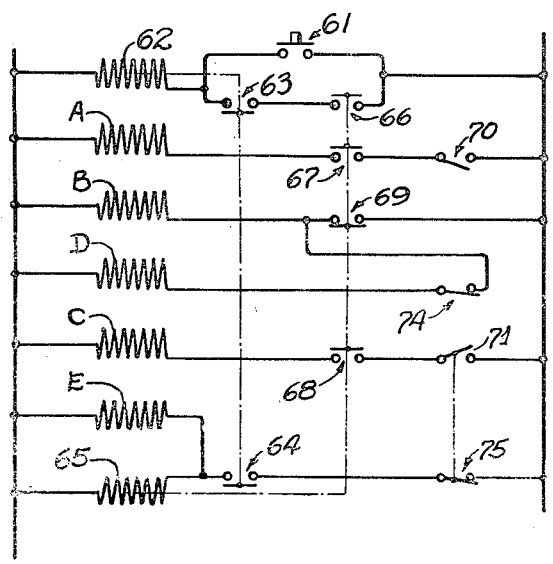

The various movements of the parts of the exemplary machine above described may be controlled manually or automatically as desired. Operation in an automatic cycle may be effected, for example, through the use of the control mechanism illustrated in Figs. 4 and 5. A motor driven pump 60 provides a source of pressure fluid which is permitted to flow to the cylinders 21, 37 and 45 and to return to a sump through the conduits shown in Fig. 4 under the control of valves V1, V2 and V3 operated by solenoids A, B, C, D, and E.

At the end of any one cycle, the parts are positioned as shown, the clamps 14 being released, the load platform 46 raised, and the arm 29 retracted to bring the cutter and work table axes into coincidence (Fig. 2). Only the solenoids B and D are energized. To start the next cycle, a manually operable switch 61 is closed, thereby connecting a relay 62 across the power lines. Energization of this relay closes its switches 63 and 64, the latter completing a circuit through the solenoid E and the coil of a relay 65. The latter is of the so-called time delay type being adapted to close its switches 66, 67, and 68 and open its normally closed switch 69 when energized and to reverse the operation of these switches after the lapse of a measured interval following deenergization of the relay coil and determined in the present instance by the time required for the work table to turn through a revolution after the cutter has been fed to depth. Closure of the switch 63 completes a maintaining circuit for the starting relay 62. Opening of the switch 69 deenergizes solenoids B and D, and closure of switches 67 and 68 prepares circuits for subsequent energization of the solenoids A and C. Deenergization of the solenoid D permits the solenoid E to act on the plunger of the valve V3 and shift the same to direct pressure fluid to the upper end of the cylinder 45 to lower the piston and the drum thereon onto the work table.

As the loading operation is being completed, a dog 72 movable with the piston rod 42 closes a switch 70 completing a circuit to the solenoid A through the then closed switch 67. Energization of the solenoid A shifts the plunger of the valve V1 permitting pressure fluid to flow to the bottom of the cylinder 21 thereby moving the piston 20 upwardly to cause clamping of the drum. In the movement of the piston rod 19, a dog 73 thereon permits a switch 74 to close. In the final movement, a dog 77 closes a switch 71 and opens a switch 75. Closure of the latter completes a circuit through the solenoid C thereby shifting the plunger of the valve V2 into a position to direct fluid pressure to the rear of the piston 36 of the feed cylinder 37 and cause feeding of the cutter into the work at the desired rate. Opening of the switch 75 energizes the solenoid E and the relay 65. However, the switches of the latter will not be operated until the timing mechanism of the relay completes its cycle. In order that the work blank shall be completely finished, the timing mechanism is set to provide sufficient time for the cutter to feed to depth and the work piece to make at least one revolution. When the timing mechanism does operate, the switches 66, 67, and 68 are opened and the switch 69 is closed. Opening of the switches 67 and 68 causes deenergization of the solenoids A and C. Deenergization of the latter permits a spring 76 to shift the valve V2 to its other position and cause return of the cutter supporting arm 29 to its normal position in which the cutter and work axes are coincident. Closure of the switch 69 causes energization of the solenoids B and D thus shifting the valves V1 and V3 to unclamp the work and raise the platform 46 thereby removing the finished work piece. Opening of the switch 66 breaks the sealing circuit for the relay 62 which permits the switch 63 to open in order that closure of the switch 75 will not effect reenergization of the relay 65 until the starting switch is again closed.

As the work is unclamped, the dog 77 moves downward thereby opening the switch 71 and closing the switch 75. At the end of the clamping operation, the dog 73 contacts the switch 74 which closes thereby conditioning the solenoid D for the next cycle. As the piston 44 of the unloading cylinder raises the work into its unloaded position, the dog 72 moves away from the switch 70 thereby opening the same.

Figs. 6 and 7 illustrate the application of the improved method to the milling of arcs of circular surfaces. The exemplary work pieces 80 have rough arcuate surfaces 81 from which a layer of metal is to be removed to form a finished surface 82 which constitutes an arc of a circle the center of curvature of which is at 83. For this application, the cutter is constructed with its edges 40 disposed on a circle having a fixed center 84 and of a diameter slightly less than that of rough work surface 81, the difference being only sufficient to provide proper loading clearance.

While relative rotary feeding movement and the cutter may be effected by revolving the rotating cutter body about the work axis, such feeding is, in this instance, obtained by rotating the work pieces, the direction of rotation being opposite to that of the cutter. To this end, the work pieces are clamped onto a table 85 mounted on the machine frame for rotation about the axis 83 and having peripheral teeth 86 meshing with a pinion 87 driven by appropriate power actuated mechanism. Upstanding from the table are annularly spaced pins 88 which are received in apertures in the work pieces, the latter being illustrated as brake shoes the friction faces of which are to be machined. Vertically slidable pins 89 on the table engage opposite end portions of the work pieces and are arranged to be raised and lowered to clamp and unclamp each work piece automatically as it leaves and approaches the loading station. A plate 90 mounted on the machine bed and disposed between the cutter and the work pieces at the loading and unloading stations serves as a guard and also assists in loading the pieces onto the pins 88.

The work table 85 and the cutter 26 rotate continuously in the directions indicated in Fig. 6. When a work piece is clamped on the table, the circle of the finished surface 82 to be formed thereon is tangent to the circle of the cutting edges along the line 91 which is the point at which each cutting edge 40 enters the work piece after the leading end has been cut to depth. The edge remains in engagement with the work over an arc greater than one-eighth of a revolution and emerges on the rough surface 81 along a line 92. Each work piece is completed when its trailing end has passed the line 91 of tangency. It will be observed that the cutting action occurring during the milling of each work piece is the same as when complete cylinders are machined with the machine previously described. That is to say, the chip removed by each blade edge is, by virtue of only the slight difference in the sizes of the cutter and work circles, so elongated in a circumferential direction and so thin radially that a high feed rate may be employed without increasing the chip thickness beyond the permissible maximum.

From the foregoing typical applications, it will be apparent that the invention is applicable equally well to the milling of external cylindrical surfaces or arcs thereof. For such uses, the cutter blades 138 project inwardly from a hollow body 126 as shown in Fig. 8 and the edges 140 would be disposed on a circle having a diameter larger than that of the rough work surface indicated by the dot-dash line. The difference would be only sufficient to provide proper clearance and permit the rough work to enter the cutter. After such entry, the cutter and work support would be shifted radially to bring the cutter circle and the finished work circle shown in full lines in Fig. 8 into tangency. The entire periphery of the work would be milled in one revolution of relative rotary feeding movement between the work piece and the rotating cutter.

It will also be apparent from the foregoing that the edges of the cutter, instead of being disposed on a cylinder and parallel to the rotational axis, may be inclined relative to the latter and thus adapted to mill tapered circular surfaces or arcs thereof. Or, the edges may be shaped to provide a wide variety of longitudinal contours on the work while still permitting of the fundamental motions previously referred to between the cutter and the work.

This application is a continuation in part of application Serial No. 179,266, filed December 11, 1937.

I claim as my invention:

1. A machine for milling an annular layer of metal from a work piece to form a circular surface or arc thereof on the work piece, said machine having, in combination, a power driven rotary cutter carrying an annular series of cutting edges defining a cutting face of a diameter such that the radius of said finished work surface is more than seventeen times the sum of the thickness of said layer plus the clearance between said cutting face and the rough work surface when the work and cutter axes are coincident, means for supporting a work piece for operation thereon by said cutter with the circle defined by said edges disposed tangent to the circle including the finished surface of the work piece and with one of such circles disposed within the other, and power actuated means to relatively rotate the work piece and the rotating cutter about the axis of the work circle and traverse the point of tangency across the work piece.

2. A machine for removing a layer of metal from a work piece to form thereon a circular surface or arc thereof having, in combination, a power driven rotary cutter carrying an annular series of cutting edges disposed relative to the rotational axis according to the contour to be formed on the work piece and arranged in a circle of a radius such that the radius of the finished work surface is more than seventeen times the sum of the thickness of said layer plus the clearance between the cutter and the rough work surface when the work and cutter axes are coincident, means for supporting the work piece for operation thereon by said cutter with the circle defined by said edges disposed tangent to the circle including the finished surface of the work piece and with one of such circles disposed within the other, and power actuated means to relatively rotate the work piece and the rotating cutter about the axis of the work circle and traverse the point of tangency across the work piece.

3. A machine for milling a circular surface or arc thereof on a work piece having, in combination, a power driven rotary cutter carrying an annular series of cutting edges extending longitudinally of the rotational axis, means for supporting a work piece for operation thereon by said cutter with the circle defined by said edges disposed tangent to the circle including the finished surface of the work piece and with one of such circles disposed within the other, and power actuated means to relatively rotate the work piece and the rotating cutter about the axis of the work circle and traverse the point of tangency across the work piece, said work and cutter circles approaching each other in size so that each of said edges engages the work piece through more than one-eighth of a revolution of relative feeding movement therebetween.

4. A machine for milling an annular surface on a work piece having, in combination, power rotated work and tool supports, means mounting said supports for relative axial movement and also for radial movement into and out of substantial axial coincidence, a cutter on said tool support having annularly spaced blades with cutting edges shaped and positioned relative to the axis of said tool support according to the contour to be formed on the work and spaced therefrom a distance differing only slightly from the radius of the rough work surface, and power driven mechanisms operable in an automatic cycle to relatively move the work piece and cutter axially into a common plane, feed the rotating cutter radially to depth, and maintain such position during at least one revolution of the work piece.

5. A machine for milling an annular surface on a work piece having, in combination, a support, a power rotated tool support, means mounting said supports for relative axial movement and also for radial movement into and out of substantial axial coincidence, a cutter on said tool support having annularly spaced edges defining a cutter face closely approximating the rough surface of the work piece, and power driven mechanisms for actuating said supports to relatively move the work piece and cutter axially into a common plane of rotation, feed the rotating cutter radially to depth, and rotate the work piece and rotating tool support about the work axis and through at least one revolution.

6. A machine for milling an annular surface on a work piece having, in combination, a work support, a power rotated tool support, means mounting said supports for relative radial movement into and out of substantial axial coincidence, a cutter on said tool support having annularly spaced blades with cutting edges shaped and positioned relative to the cutter axis according to the contour to be formed on the work piece, the radius of said annular work surface being more than seventeen times the sum of the thickness of the metal layer to be removed plus the radial clearance between the cutter and rough work surface when the work and cutter axes are coincident whereby to provide only sufficient clearance for permitting of relative axial movement of the cutter and work piece into engaging relation, and means for relatively rotating said cutter and work piece about the axis of the latter.

7. A machine for milling an annular surface on a work piece having, in combination, power rotated work and tool supports, means mounting said supports for relative radial movement into and out of substantial axial coincidence, and a cutter on said tool support having annularly spaced blades with cutting edges extending generally longitudinally of the axis of said tool support and spaced therefrom a distance differing only slightly from the radius of the rough surface of the work and such that the radius of the finished work surface is more than seventeen times the sum of the thickness of said layer plus the clearance between the cutter and the rough work surface when the work and cutter axes are coincident.

8. A machine for milling the internal surface of a brake drum having an inturned flange at one end, said machine having, in combination, a fixture rotatable about a vertical axis and adapted to receive the open end of said drum open end down, a support engageable with said flange to center the drum relative to the fixture and reciprocable axially of said fixture to move the drum into and out of the latter, a rotary cutter having blades annularly spaced around its periphery with edges spaced from the cutter axis a distance differing from but approximating the radius of the rough work surface, means supporting said cutter to turn about a vertical axis and also for movement of its axis laterally into and out of coincidence with said fixture axis, and means for relatively rotating said fixture and the rotating cutter about the fixture axis when the two axes are offset.

9. A machine for milling an annular surface on a work piece having, in combination, a fixture rotatable about a vertical axis and adapted to receive the work piece with the axis of the latter disposed vertically, a support engageable with the work piece to center the same relative to said fixture and reciprocable axially of the fixture to move the work piece into and out of the latter, a rotary cutter having blades annularly spaced around its periphery with edges spaced from the cutter axis a distance differing from but approximating the radius of the rough work surface, means supporting said cutter to turn about a vertical axis and also for movement of its axis laterally into and out of coincidence with said fixture axis, and means for relatively rotating said fixture and the rotating cutter about the fixture axis when the two axes are offset.

10. A machine for milling an annular surface on a work piece having, in combination, a fixture rotatable about a vertical axis and adapted to receive the work piece with the axis of the latter disposed vertically, a rotary cutter having blades annularly spaced around its periphery with edges spaced from the cutter axis a distance differing from but approximating the radius of the rough work surface, a horizontally swingable arm supporting said cutter to turn about a vertical axis and also for movement of its axis laterally into and out of coincidence with said fixture axis, power actuated means for rotating said cutter including a drive element rotatable about the pivotal axis of said arm, and means for relatively rotating said fixture and the rotating cutter about the fixture axis when the two axes are offset.

11. A machine for milling an annular surface on a work piece having, in combination, continuously rotated work and tool supports, means mounting said supports for relative axial movement and also for radial movement into and out of substantial axial coincidence, work clamping means on said tool support, a cutter on said tool support having annularly spaced edges defining a cutter face closely approximating the rough surface of the work piece, and power driven mechanisms for actuating said supports and clamping means to relatively move the work piece and cutter axially into a common plane of rotation, clamp the work piece on said rotating tool support, feed the rotating cutter radially to depth, and maintain the position of the cutter through at least one revolution of the work support.

12. A machine for removing a layer of metal from a rough arcuate surface of a work piece to form a finished surface comprising the arc of a circle, said machine having, in combination, a continuously rotated cutter having an annular series of cutting edges disposed on a circle of a diameter such that the radius of said finished work surface is more than seventeen times the sum of the thickness of said layer plus the clearance between said cutting face and the rough work surface when the work and cutter axes are coincident, a support for mounting a work piece for engagement with said edges and with said cutter circle and circle of the finished work surface disposed tangent to each other and with one of such circles disposed within the other, and mechanism operating continuously to relatively feed said work support and said rotating cutter about the axis of said work circle.

13. The method of removing a layer of metal from an annular surface on a work piece which comprises rotating a series of cutting edges in a circle differing in size from but approaching a circle including the rough work surface so closely that the radius of the finished work surface is at least seventeen times the sum of the thickness of said layer plus the radial clearance between said circle and the rough work surface when the work and cutter axes are coincident, relatively moving said work piece and edges axially with their axes substantially coincident whereby to bring the edges and said rough surface into a common plane of rotation, relatively moving the work piece and said edges radially to feed the edges into the work to the desired depth, and finally bodily rotating the work piece and the rotating edges relative to each other about the work axis and through at least one revolution.

14. The method of removing a layer of metal from an annular surface on a work piece which comprises rotating a series of cutting edges in a circle differing only slightly in size from a circle including the rough surface of said work piece so that the radius of the finished work surface is at least seventeen times the sum of the thickness of said layer plus the radial clearance between said circle and the rough work surface when the work and cutter axes are coincident, relatively moving said work piece and said edges axially while their axes are substantially coincident whereby to bring the edges opposite said rough surface, relatively moving the work piece and said edges radially to feed the edges into the work to the desired depth, and then rotating the work piece through at least one revolution.

15. The method of removing a layer of metal from a work piece to form an annular surface thereon which comprises rotating a series of cutting edges in a circle differing in diameter from the rough surface of the work piece by an amount such that the radius of the finished work surface is more than seventeen times the sum of the thickness of said layer plus the clearance between the cutter and the rough work surface when the work and cutter axes are coincident, relatively moving said work piece and edges axially while their axes are substantially coincident, relatively moving the work piece and said edges radially to feed the edges into the work to the desired depth, and relatively rotating the work piece and the rotating edges about the axis of said annular surface and through at least one revolution.

16. The method of removing a layer of metal to form at least an arc of a circular surface on a work piece which comprises arranging a series of cutting edges on a cylinder of revolution of a diameter such that the radius of the finished work surface is more than seventeen times the sum of the thickness of said layer plus the clearance between the cutter and the rough work surface when the work and cutter axes are coincident, positioning said edges and the work piece with said cylinder tangent to the circle of the finished work surface and with said cylinder and circle disposed one within the other, rotating said edges about the axis of said cylinder, and simultaneously relatively rotating the rotating cutting edges and said work piece about the axis of said finished surface to traverse the point of tangency circumferentially across the work.

17. The method of removing a layer of metal to form at least an arc of a circular surface on a work piece which comprises rotating a series of cutting edges in a circle of a diameter such that the radius of the finished work surface is more than seventeen times the sum of the thickness of said layer plus the clearance between the cutter and the rough work surface when the work and cutter axes are coincident, positioning said edges and the work piece with said circle tangent to the circle of the finished work surface and with one of such circles disposed within the other, and relatively rotating the rotating cutting edges and said work piece about the axis of the work circle to traverse the point of tangency across the work.

18. The method of removing a layer of metal to form at least an arc of a circular surface on a work piece which comprises rotating a series of cutting edges in a circle of a radius such that the radius of the finished work surface is more than seventeen times the sum of the thickness of said layer plus the clearance between the cutter and the rough work surface when the work and cutter axes are coincident, positioning said edges and the work piece with said circle tangent to the circle of the finished work surface and with one of such circles disposed within the other, and relatively rotating the rotating cutting edges and said work piece about the axis of the work circle to traverse the point of tangency across the work surface.

19. The method of removing a surface layer of metal from a work piece to form an arcuate finished surface thereon, said method comprising revolving a series of cutting edges lying on and annularly spaced around a cylinder of revolution, and causing relative feeding movement between said series of revolving edges and said work piece along an arcuate path gradually diverging away from but following said finished surface so closely that the edges move through the work longitudinally of the direction of feed and through a cutting zone extending between the rough and finished surfaces thereof and at least five times longer in the direction of feed than the angular distance between two adjacent cutting edges thereby removing overlapping layers of metal which are very long in the direction of feed and very thin in a direction perpendicular to the finished surface.

20. The method of removing a layer of metal from an arcuate surface on a work piece comprising relatively feeding the work piece and a series of cutting edges along a predetermined arcuate path concentric with the finished surface to be produced on the work piece, and revolving said edges through the work along curved paths gradually diverging from and tangent to said finished surface to cut off metal in slices each having a maximum thickness which is a small fraction of the feeding movement per cutting edge and a length in the direction of feed equal at least to one-tenth of the circumference of the path traversed by said edges.

21. The method of removing a surface layer of metal from a work piece to form an arcuate finished surface thereon, said method comprising revolving a series of annularly spaced cutting edges, and causing relative feeding movement between said series of revolving edges and said work piece along an arcuate path having a radius of curvature approaching so closely to that of said finished surface that said edges move through the work longitudinally of the direction of feed and through an effective cutting zone extending between the rough and finished surfaces for more than forty-five degrees.

22. A machine tool for removing metal from a work piece to form an arcuate surface thereon comprising, in combination, a work support, a tool support, power actuated mechanism for feeding said supports relative to each other about the center of curvature of said arcuate surface, a power actuated cutter head on said tool support rotated about an axis disposed closely adjacent said center of curvature, and a series of elongated cutting edges on said head annularly spaced around said axis to define a cutting face and movable broadwise through a zone of the work having a length in the direction of feed at least equal to one-tenth the circumference of said cutting face and diverging away from a line of tangency with the finished work surface so that the maximum thickness of each slice of metal removed is only a small fraction of the feeding movement per cutting edge.

CHARLES E. KRAUS.